(12) United States Patent
Koltunov et al.

(10) Patent No.: US 6,837,617 B1
(45) Date of Patent: Jan. 4, 2005

(54) DETECTION AND RECOGNITION OF OBJECTS BY MULTISPECTRAL SENSING

(75) Inventors: Yoseph Koltunov, Holon (IL); Alexander Maximov, Jerusalem (IL); Igor Meltin, Giv'at Shmuel (IL); Motti Allon, Mazkeret Batya (IL); Glen Guttman, Tel Aviv (IL); Arik Kershenbaum, Ra'Anana (IL)

(73) Assignee: Israel Aircraft Industries Ltd., Lod (IL)

( * ) Notice: Subject to any disclaimer, the term of this patent is extended or adjusted under 35 U.S.C. 154(b) by 0 days.

(21) Appl. No.: 09/530,758

(22) PCT Filed: Nov. 20, 1998

(86) PCT No.: PCT/IL98/00568

§ 371 (c)(1),
(2), (4) Date: Oct. 26, 2001

(87) PCT Pub. No.: WO99/27336

PCT Pub. Date: Jun. 3, 1999

(30) Foreign Application Priority Data

Nov. 20, 1997 (IL) .................................................. 122258

(51) Int. Cl.[7] .............................. G01J 5/02; G01J 1/00; G06K 9/46
(52) U.S. Cl. ........................ 374/121; 382/204; 382/228; 250/208.1; 702/3
(58) Field of Search ................................ 374/120, 121, 374/126, 137; 702/2–4; 250/316.1, 580, 208.1, 559, 4–44, 330, 339.04, 339.06, 342, 586; 382/190, 195, 204, 228, 225, 221, 224

(56) References Cited

U.S. PATENT DOCUMENTS 4,005,289 A * 1/1977 Del Grande ................. 250/253
4,659,234 A    4/1987 Brouwer et al.
4,675,677 A    6/1987 von Maydell et al.
4,754,492 A *  6/1988 Malvar ....................... 382/268

(List continued on next page.)

FOREIGN PATENT DOCUMENTS

| DE | 41 34 313 A1 | 4/1993 |
|---|---|---|
| EP | 0 143 282 A2 | 6/1985 |
| EP | 0 420 108 B1 | 4/1991 |
| GB | 2 131 649 A | 6/1984 |
| WO | WO 97/11340 | 3/1997 |

(List continued on next page.)

OTHER PUBLICATIONS

Kahle et al., "Middle infrared multispectral aircraft scanner data: analysis for geological applications", Applied Optics, Jul. 15, 1980, vol. 19, No. 14, pp. 2279–90.
Price, "Thermal Inertia Mapping: A New View of the Earth", Journal of Geophysical Research, Jun. 20, 1977, vol. 82, No. 18, pp. 2582–90.
Blake, "Ground–penetration radar developed by Sweden", International Defense Review, Mar. 1993, pp. 193–202.

*Primary Examiner*—Gail Verbitsky
(74) *Attorney, Agent, or Firm*—Oliff & Berridge, PLC

(57) ABSTRACT

A method and a system for determining temperature and/or emissivity of an object by remote sensing are described. Based on the concept of temperature and emissivity determination, there are also developed a method and a system for the detection and recognition of an object that includes a plurality of sub-objects. The method for the detection and recognition of an object comprises acquiring, inter alia, electromagnetic radiation data of electromagnetic radiation emitted from a selected region in at least two spectral bands, recording and storing the required electromagnetic radiation data, deriving descriptive maps constituted by pixels of the selected region from the stored data and classifying the pixels of said descriptive maps of said selected region by pattern recognition processor means.

32 Claims, 8 Drawing Sheets

U.S. PATENT DOCUMENTS

| | | | | |
|---|---|---|---|---|
| 4,916,745 A | * | 4/1990 | Hart et al. | 382/275 |
| 4,974,182 A | | 11/1990 | Tank | |
| 5,118,200 A | * | 6/1992 | Kirillov et al. | 374/120 |
| 5,132,922 A | * | 7/1992 | Khan et al. | 702/134 |
| 5,156,461 A | * | 10/1992 | Moslehi et al. | 374/121 |
| 5,255,190 A | * | 10/1993 | Sznaider | 702/3 |
| 5,263,097 A | * | 11/1993 | Katz et al. | 382/190 |
| 5,325,445 A | * | 6/1994 | Herbert | 382/225 |
| 5,377,126 A | | 12/1994 | Flik et al. | |
| 5,390,125 A | * | 2/1995 | Sennott et al. | 701/214 |
| 5,497,430 A | * | 3/1996 | Sadovnik et al. | 382/156 |
| 5,550,937 A | * | 8/1996 | Bell et al. | 382/293 |
| 5,588,032 A | * | 12/1996 | Johnson et al. | 378/8 |
| 5,608,405 A | * | 3/1997 | Pritt | 342/25 |
| 5,796,611 A | * | 8/1998 | Ochiai et al. | 702/3 |
| 5,798,864 A | * | 8/1998 | Sekiguchi | 359/559 |
| 5,867,386 A | * | 2/1999 | Hoffberg et al. | 700/83 |
| 5,878,746 A | * | 3/1999 | Lemelson et al. | 600/407 |
| 5,920,839 A | * | 7/1999 | Iso | 704/256 |
| 5,929,980 A | * | 7/1999 | Yamaguchi et al. | 356/4.03 |
| 5,930,330 A | * | 7/1999 | Wolfe et al. | 378/98.2 |
| 6,000,844 A | * | 12/1999 | Cramer et al. | 374/5 |
| 6,052,677 A | * | 4/2000 | Masuoka et al. | 706/12 |
| 6,055,480 A | * | 4/2000 | Nevo et al. | 702/3 |
| 6,128,578 A | * | 10/2000 | Sakaino et al. | 702/3 |
| 6,173,068 B1 | * | 1/2001 | Prokoski | 382/115 |
| 6,307,500 B1 | * | 10/2001 | Cornman et al. | 342/26 R |
| 6,485,625 B1 | * | 11/2002 | Simpson et al. | 204/601 |
| 6,496,592 B1 | * | 12/2002 | Lanini | 382/103 |
| 6,748,327 B1 | * | 6/2004 | Watson | 702/3 |
| 2003/0025627 A1 | * | 2/2003 | Wilson et al. | 342/26 |
| 2003/0220740 A1 | * | 11/2003 | Intriligator et al. | 702/3 |
| 2004/0066966 A1 | * | 4/2004 | Schneiderman | 382/159 |
| 2004/0162675 A1 | * | 8/2004 | Moon et al. | 702/3 |

OTHER PUBLICATIONS

Clark et al., The International Society for Optical Engineering, SPIE, 1942, 178.

Wolf and Zissis, Editors, 1993, The Infrared Handbook,— revised edition, Environmental Research Institute of Michigan.

Selby et al., 1978, Atmospheric Transmittance/Radiance: Computer Code LOWTRAN 4, report No. AFGL–TR–78–0053, Optical Physics Division, Project 7670, Air Force Geophysics Laboratory, Hanscom AFB, MA, USA.

Bramson, 1968, Infrared Radiation—A Handbook for Applications, Plenum Press.

Various articles appearing in : Proceedings of the First International Airborne Remote Sensing Conference and Exhibition, Sep. 12–15, 1994, Strasbourg, France.

Kondratyev, 1969, Radiation in the Atmosphere, 62, Academic Press.

Jacob, 1995, Heat Transfer, John Wiley & Sons, p. 473. Eqn. (22–91), p. 555 by Eqn. (26–29).

Rosema, 1975, "Simulation of the Thermal Behaviour of Bare Soils for Remote Sensing Purposes", Report 11, Netherlands Interdepartmental Working Community for the Application of Remote Sensing Technology, Delft, The Netherlands.

Tou et al., 1974, "Pattern Recognition Principles", Addison–Lesley Publishing Co. Inc.

Haralick, 1982, "Image Texture Survey", Handbook of Statistics, Krishiniah and Kanal, editors,vol. 2, 399.

Rao, 1973, Linear Statistical Interference and its Application, Wiley.

Rolston, Principles of Artificial Intelligence and Expert Systems Development, McGraw–Hill, 99.

Kealy et al., "Separating Temperature and Emissivity in Thermal Infrared Multispectral Scanner Data: Implications for Recovering Land Surface Temperatures", IEEE Transactions on Geoscience and Remote Sensing vol. 31, No. 6, Nov. 1993.

Nagura et al. "Optical Sensor System for Japanese Earth Resources Satellite–1", NEC Research and Development, vol. 33, No. 2, Apr. 1, 1992, pp. 226–235.

Database WPI, Section E1, Week 8839, Derwent Publications Ltd., London GBp Class SO3, AN 88–277509. (w/English translation).

* cited by examiner

DETECTION AND RECOGNITION OF OBJECTS BY MULTISPECTRAL SENSING

FIELD OF THE INVENTION

The present invention relates to a method and a system for detection and recognition of objects by multispectral sensing

BACKGROUND OF THE INVENTION

Various approaches have been used, for example, for passive remote sensing of the ground. Thus maps of surface brightness, temperature and emissivity have been used for investigating geological surface properties (Kahle et al. 1980, Applied Optics, 19, 2279), whereas maps of thermal inertia have been used to infer subsurface properties of soil (Price, 1977, Journal of Geophysical Research, 82, 2582).

EP-A-O 143,282; EP-A-O 420,108; and U.S. Pat. No. 5,377,126 disclose various approaches for remote determination of emissivity and temperature of an object. The determination was performed by measuring the multi-spectral electromagnetic radiation and applying various models, which provide dependence of emissivity on wavelength and temperature by solving a set of equations, which include emissivity and temperature as parameters. As such, these approaches enable to obtain the object's temperature and emissivity in various cases, including that in which these parameters vary in time.

The detection of underground structures requires penetration of the ground and is therefore accomplished by active sensing techniques, such as radar (Blake, 1993, "Ground-Penetration Radar Developed by Sweden," International Defense Review, 3, 193; von Maydell et al, 1987, U.S. Pat. No. 4,675,677), or combined passive sensing and radar (Clark et al, SPIE—The International Society for Optical Engineering, 1942, 178).

It is acknowledged in the prior art, that emissivity of various materials may noticeably depend on wavelength of the emitted radiation and temperature of the sample.

For example, U.S. Pat. No. 4,659,234 describes a method of emissivity error correcting for radiation thermometer, where temperature is determined based on two measurements of radiated infrared energy at two closely adjoining wavelengths, and the result is corrected using one single measurement. While the method is aimed to solve a problem of determining the randomly changing value of emissivity of heated metal objects, it does not take into consideration any dependence of emissivity on the radiation wavelength, and much less—on temperature of the object. Such an approach renders the method inaccurate.

U.S. Pat. No. 5,132,922 describes an emissivity independent multi-wavelength pyrometer operating according to a method using a least-squares-based multiwavelength pyrometry technique and a theoretical function for the dependence of the radiance on the wavelength. However, in this method the emissivity/wavelength function is considered to be the same in all spectral bands, which either leads to a significant reduction in the accuracy of the determined: temperature, especially for heated non-transparent materials, or to the use of narrow-band filters. The latter poses a problem for infra-red measurements in real time. since narrow band filters provide insufficient energy for further processing.

Moreover, all the described above methods make an assumption that emissivity of an object is independent of its temperature, since none of the methods appear to suggest any way of considering this dependency for determining temperatures. Such an assumption inadvertently leads to essential errors in the temperature determination for at least non-transparent heated material.

In many branches of industry, for example in metallurgy or in manufacture of semiconductor devices samples and materials are exposed to various operations while being in the heated condition.

Determining temperature of such objects during the manufacturing process presents a very important task, which is rather difficult due to the following factors:

it is impossible to perform direct temperature measurements. so the temperature determining is usually performed via the remotely acquiring data on the infrared radiation of the sample and further processing this data, in the mathematical processing of the remotely obtained data many parameters intrinsic to the material of interest must be used (such as its thermal emissivity, etc.), which are usually unknown and cannot be directly measured.

Another important task is detection (usually in the dark) and recognition of various objects having different temperatures and/or emissivities. Difficulties of such a process are essentially the same as outlined above.

SUMMARY OF THE INVENTION

It is therefore the purpose of the present invention to provide an accurate method of remotely determining temperature and/or emissivity function of objects. It is to be noted, that the problem of determining the emissivity function of real objects is one of important problems in many industrial applications.

Another objective of the invention is designing a system for implementing the above-mentioned method.

Yet another objective of the present invention is to provide a method and a system being capable of detecting and, where applicable, identifying objects on the basis of remotely determined temperature and emissivity distributions.

A specific objective of the present invention will be to provide a real lime recognition of objects (usually in the dark) from a movable platform, using the inventive method.

The term "object" is used herein in a broad sense to denote any kind of structure, crop or articles in a solid, liquid or gaseous state on the ground, natural and artificial underground structure, as well as objects located above the ground (such as solid samples, oil spots on water, clouds, overhead electric wires, etc.).

For the sake of simplicity the term "object detection" will be used in the following description and claims to denote the detection of an object or objects or of some properties thereof.

The above main purpose can be achieved by providing a method of remotely determining temperature of an object, comprising:

acquiring electromagnetic radiation data from the object in N spectral bands, deriving temperature value from said data using a system of equations, each describing the electromagnetic radiation that is emitted from the object in said band as a function of temperature and emissivity of the object:

the method being characterized in that, said electromagnetic radiation is measured M times. each time in N said spectral bands, thus obtaining N*M readings, a system of N*M equations is formed, each describing the electromagnetic radiation that is emitted from the object in said band as a function of temperature T and emissivity $\epsilon$ of the object wherein the emissivity $\epsilon$ is described by a model incorporating at least one function, of at least two arguments being temperature T and wavelength $\lambda$; said system comprising N*M readings of the electromagnetic radiation and at least M+P unknowns which include M values of the objects temperature corresponding to said respective M measurements of the electromagnetic radiation and P parameters. wherein P$\geq$2 said parameters belonging to said model of emissivity;

solving said system of N*M equations, thus deriving temperature of the object at any one of the M moments of said electromagnetic radiation measurement wherein M is a natural number of the set [1, 2, 3 . . . ].

According to one particular version of the above method. the mentioned model is selected to comprise one function $\epsilon=f(\lambda,T)$ taking constant values within respective spectral bands, and therefore P is considered equal to N, thereby said system of N*M equations is formed to comprise N*M readings of the electromagnetic radiation and N+M unknowns which include M values of the object's temperature corresponding to said respective M measurements of the electromagnetic radiation, and N values of emissivity for said respective N spectral bands.

The above-defined particular method is based on the following assumptions:

1. Emissivity of the object in each one of the N spectral bands is a predetermined function of temperature having parameters which are constant during all the M measurements of the electromagnetic radiation performed in this band
2. During each specific measurement of the electromagnetic radiation, temperature of the sample is assumed to be constant (i.e. its change is considered negligible), regardless the spectral band where such specific measurement is performed.

The assumption 2 is best fulfilled if each measurement of the electromagnetic radiation is performed in all N spectral bands substantially simultaneously. It is especially important for accurate measurements concerning objects which undergo either heating or cooling. For an object or a plurality of objects which have rather constant or slowly changing temperatures, the measurements in N spectral bands may be accomplished in sequence, at a maximally available speed.

In practice. i.e. when digital computing technology is used for controlling the process of measurements and processing the obtained data, each of said M multispectral measurements of the electromagnetic radiation (i.e. each of said M*N readings thereof) is digitized and stored in a computer memory for further computerized processing, said processing comprising substituting the digitized M*N readings of the electromagnetic radiation into said M*N equations, and solving thereof.

Preferably, the above measurements are to be provided in the infrared spectrum.

According to one specific version of the method said equations are integral ones, for example Fredholm equations relating to emissivity.

It should be emphasized, that the above-defined method easily provides sufficiently accurate temperature values both in cases when emissivity of the object essentially varies from one spectral band to another (either due to dispersion between these bands, or due to specific physical properties of the object), and in cases when the emissivity is rather uniform throughout the spectrum.

In addition, a succession of temperature values obtained by the method can be used for real-time monitoring and controlling of the object's thermal condition, for example during a technological process to which the object is subjected.

It is well known, that at high temperatures (i.e. those between the room temperature and 1,500° C.) emissivity of some real materials, such as semiconductor samples, varies not only from one spectral band to another, but also depends on the temperature of the sample. One of the reasons for such an effect is degrading of the sample's transparency with the temperature increase, that consequently affects emissivity of the sample. In other words, the simplest case of assumption 1 mentioned above is not applicable to such objects. and. when temperature of heated non-transparent objects must be determined. the method where only N+M unknowns are sought for will not be sufficiently accurate. It means, that if the sample emissivity is considered to be independent from temperature while the sample undergoes any thermal treatment, this assumption will be a source of essential errors in calculations of the temperature.

Having assumed, that emissivity of the heated sample is a known mathematical function of temperature and wavelength with unknown parameters. the inventors suggested to introduce such parameters as unknowns into the above-mentioned system of equations. in order to obtain values of the parameters by solving the system.

More particularly, each of said M*N equations describes the electromagnetic radiation that is emitted from the object in one of said bands as a function of the temperature and the respective emissivity of the object, the emissivity, in turn, being a known function of temperature, wavelength and a known number of unknown parameters; said parameters being introduced as additional unknowns into said system of equations for further obtaining their values upon solving the system.

In one example, the mentioned known function may be represented as a sum of a known number of terms of two other functions, a first of which being dependent only on temperature and a known number of unknown parameters, and a second—only on wavelength and another known number of other unknown parameters.

According to another example, this known function may be represented by a polynomial expansion having K unknown coefficients. said coefficients being introduced into the system of equations as unknown parameters to be determined among said unknowns upon solving said system.

If the emissivity variable in each of the above mentioned equations is represented as a polynomial function having K unknown coefficients. the system of the equations will overcome some transformations. Namely, though the number of equations NIM is unchanged, the number of unknowns in the system will increase and become equal to M+K*N, where K is the number of polynomial coefficients of the function emissivity/temperature in each of the N spectral bands. However, if the numbers of the polynomial coefficients are different in different spectral bands (which case is more general and more correct from the physical point of view), the number of unknowns in the system will be M+($K_{A1}+K_{A2}$ . . . +$K_{AN}$), where $K_{A1}$ . . . $K_{AN}$ are numbers of the polynomial coefficients of the emissivity/temperature function in each of the spectral bands, respectively.

In practical applications, where the electromagnetic measurements are performed and processed by the aid of computer. the number of electromagnetic radiation measurements M and the number of spectral bands N may be as great as is wished. For example, in industrial conditions during a is relevant technological process up to 2,000 measurements may be performed in a short period of time, each measurement taking from 1 to 10 msec. On the other hand, the number K of polynomials in the function emissivity/ temperature usually does not exceed 4. Owing to that the system of such equations is solvable, since $N*M >> M+K*N$, or $N*M >> M+(K_{\Delta 1}+K_{\Delta 2} \ldots +K_{\Delta N})$.

The most effective application of the above described modified method is for non-contact temperature measurement of heated non-transparent objects, for example of semiconductor materials and samples during their manufacture.

It should be emphasized, that, since values (parameters) of the emissivity function are solutions of said system of M*N equations. as well as the temperature values are, the disclosed above method of remotely measuring temperature of an object constitutes also a method of determining the emissivity function of the object.

In other words, there is provided a method of remotely determining emissivity function of an object, comprising acquiring electromagnetic radiation data from the object in N spectral bands in the infrared spectrum by measuring it M times, each time in N said spectral bands. thus obtaining N*M readings, forming a system of N*M equations, each describing the electromagnetic radiation that is emitted from the object in one of said bands as a function of temperature T and emissivity $\epsilon$ of the object, wherein the emissivity $\epsilon$ is described by a model incorporating at least one function, of at least two arguments being temperature T and wavelength $\lambda$; said system comprising N*M readings of the electromagnetic radiation and at least M+P unknowns including M values of the object's temperature corresponding to said respective M measurements of the electromagnetic radiation, and P parameters, wherein $P \geq 2$; said parameters belonging to said model of the emissivity solving said system of N*M equations to derive said P parameters, thereby reconstructing the emissivity function of the object.

All the above-described modifications of the method for determining temperature are applicable to the method for determining emissivity, *mutatis mutandis*.

It should be appreciated, that the above described methods for remotely determining temperature and/or emissivity function of an object may be utilized for deriving temperature and/or emissivity descriptive maps of the object.

To the above-mentioned purpose, the object is to be divided into a plurality of representative segments, and each segment is to be investigated according to the above-suggested technique. The processed data on the temperature and/or emissivity function associated with each specific segment of the object can then be used for forming a corresponding pixel of the respective descriptive map.

As has been mentioned earlier, "the object" is defined in a broad sense, so it can be understood as a plurality of so-called sub-objects having different temperatures and/or emissivities and dislocated in a selected region which limits the object in space (for example, the sub-objects being such as the ground, the space above including one or more articles. the surrounding atmosphere in the selected region). Consequently, when the object is divided into plurality of representative segment; in most cases the sub-objects will not coincide with the representative segments. for example one sub-object may be covered by a number of segments and should be thereby represented by a number of corresponding pixels.

Further, the above-described method can serve for the object detection on a background of the ground and/or the surrounding atmosphere is in a selected region. For this purpose, the method may additionally comprise the following steps:

acquiring meteorological data indicative of climatic conditions of the selected region on the ground and/or the surrounding atmosphere;

recording the acquired electromagnetic radiation and meteorological data by means of suitable data recording means;

storing the so-recorded data in suitable data storage means and deriving from the so-stored data, descriptive maps of the selected region; and feeding data of said descriptive maps into pattern recognition processor means to classic the pixels of said maps of said selected region, whereby the desired object detection is achieved.

By one embodiment of the invention said meteorological data are obtained from meteorological stations.

Typically the said descriptive maps are temperature, emissivity and albedo maps. Albedo is a parameter which can be defined as follows:

$$A = \frac{R_v}{\tau_v \tau_n W_S}$$

where, $R_v$ is the radiation measured by the radiometer in the visible and near infra red regions; $\tau_v$, is the atmospheric transmissivity in the visible and near infra red regions; $\tau_o$, is the optical transmissivity of the radiometer including the transmissivity of the spectral filter in the visible and near infra red regions; and $W_S$ is the radiation from the sky.

According to one embodiment of the invention applicable in cases where the objects detection is based on pronounced temperature and/or emissivity differential between the representative segments of the object the object detection according to the invention is based on a single scanning pass of the selected region (i.e. M=1). This embodiment of the invention marl be applicable, for example, to the detection of overhead high voltage wires, is defects in the wires, connectors and insulators, or diseases in crops. In the performance of this embodiment, the descriptive maps describe temperature and emissivity and the pattern recognition processor means classifies the pixels according to temperature and/or emissivity difference. Typically, the emissivity map is used by the pattern recognition means in the classification process. In the case of overhead high voltage systems for example, any such local temperature increase denotes a possible defect in the inquiry sector thereof.

If desired, the emissivity map can be used to remove background noise. hence enhancing the temperature differences of the object under investigation. This is done by using the emissivity map to identify those pixels belonging to the object under investigation. Any temperature differences belonging to the background are then eliminated.

According to another embodiment of the invention the object detection is based-on multiple scanning passes at desired times (M=2, 3, 4 . . . ) and said descriptive maps describe temperature, emissivity and albedo, wherefrom a set of characteristic maps of the selected region are derived by incorporating suitable reference data.

Typically an optimal set of characteristic maps of the selected region is chosen and data thereof are fed into the pattern recognition processor means in order to classify the pixels of said optimal set of characteristic maps of the selected region, whereby the desired object detection is achieved. The set of characteristic maps may comprise maps of thermal inertia, thermal flux, coefficient of heat transfer and coefficient of mass transfer.

The scanning of the selected region for measuring electromagnetic radiation in a number of spectral bands may be effected either by remote scanning or by close range scanning.

In general, the pattern recognition processor means first defines the number of classes that the selected region is to be divided into. It then divides the selected region into the defined number of classes by statistically associating each pixel of the characteristic maps with a given class. Although the classes are not necessarily identified with areas having different physical properties, e.g., areas of water, rocks, vegetation, sand, soil, etc., there should be some correlation between the two for the process of associating the pixels to each class to be successful. For a given selected region there exist preliminarily determined universal reference data that are required in order to evaluate the characteristic maps. The values of the reference data are obtained in controlled experiments as described below. It has been found that sufficient accuracy can be obtained in the detection process by using an average set of universal constants. This set is derived by taking the average value of the set obtained for around relative humidities less that 12% and that obtained for ground relative humidities greater or equal to 12%. The term "universal reference data" indicates that, to a good approximation, the reference data are suitable for all kinds of backgrounds and objects. In the advent that greater accuracy with respect to the ground humidity, is desired in the detection process. the universal sets from which the average set was derived can be used. depending on the humidity of the ground.

When the object detection according to the invention aims at detecting below ground level characteristics of the selected region, e.g. at finding underground artificial structures, geological structures holding deposited minerals, etc., the underground structure of interest will then show up as an anomalous pattern in the pattern recognition process, due to the fact that the heating and cooling processes of the ground are different in the region of the underground structure as compared to the surrounding region which is absent of such underground structures. In other words, the pattern recognition means will not be able to associate those pixels identified with the underground structure with one of the defined classes.

In general then, object detection entails pixel classification. in which a number of classes is defined and the pixels in the selected region are statistically associated with the classes. To this end a quality function is defined and the pattern recognition process entails determining that set of characteristic maps that maximizes the quality function. Anomalous patterns are those in which the pixels cannot be associated with a given class in the selected region. Where possible, it is preferable that the pixel classes correspond to areas having well known physical properties.

Although the reference data can be considered as universal. more accurate values can be used if desired. Values for the reference data for different backgrounds or objects can be obtained by measuring the radiation from a reference sample of known emissivity, of the background or object of interest at predetermined times and at the same time directly measuring the temperature thereof. The reference data can then be derived from the measured data by utilizing an energy balance equation.

By one embodiment of the invention the remote scanning of the selected ground region is performed with at least five sensors operating. respectively, in the $3-4\mu$, $4-5\mu$, $8-10\mu$, $10-12\mu$ and the near infrared and visible spectral bands, and there is provided at least one further sensor for measuring electromagnetic radiation from the space above, operating in the $0.4-2\mu$ a spectral band.

Quite generally, the characteristic maps of the selected region include maps of thermal inertia, thermal conduction flux, coefficient of heat transfer, coefficient of mass transfer, and the mean, variance and texture maps derived therefrom. However, if the relative humidity of the ground in the scanned region is greater that 30%, these maps cannot be computed.

Preferably, the said classifying processor means in which the pixels of the characteristic maps of the selected region are classified into classes. makes use of a poly-Gauss expansion to describe the statistical distribution of the pixels and Bayes' method to sort the pixels into classes.

For the said evaluation of the sets of characteristic maps for the purpose of selecting therefrom an optimal set, the said pattern recognition means comprises quality factor evaluation means and the pattern recognition process entails determining a set of characteristic maps for which the quality factor is the highest, thereby giving rise to the best pixel classification.

The pattern recognition means can also include additional geometrical classification means for determining the shape of the detected object.

Still further, the method can be specifically adapted for real time temperature emissivity mapping of a plurality of selected regions to be observed, in said method the step of acquiring said electromagnetic radiation data is provided in real time by equipment mounted on a movable platform. while displacing alone said plurality of selected regions; wherein the steps of recording and storing the acquired electromagnetic radiation and meteorological data and further deriving from the so-stored data, descriptive maps of the selected region are registered (i.e. aligned) with the platform displacement.

It is understood, that the above method may include automatic recognition of objects positioned along or on the course of the moving platform, such as a vehicle. Still further, the method may comprise steps of initiating an alarm and, optionally, of automatic adjusting the course of the vehicle whenever an obstacle is recognized.

In accordance with a further aspect of the invention, there is provided a system for remotely determining temperature and/or emissivity function of an object said system comprising:

scanning means for acquiring electromagnetic radiation data from the object M times, each time in N spectral bands, thus obtaining N*M readings of the electromagnetic radiation, wherein M is a natural number of the set [1, 2, 3 . . . ];

means for recording and storage said N*M readings in the digital form;

computational means for processing said N*M readings of the electromagnetic radiation as a system of N*M equations comprising M unknown values of temperature and at least P unknown parameters, wherein P>2; said parameters belonging to a model of the objects emissivity. the model comprising at least one function of at least two arguments being temperature T and wavelength $\lambda$;

display means for displaying one or more of said unknowns obtained upon solving said system of equations, or derivatives therefrom.

The above system for remotely determining temperature and/or emissivity function of an object can serve for deriving temperature and/or emissivity descriptive maps of the object, if said scanning means are capable of acquiring the electromagnetic radiation from a plurality of representative segments of the object and said computational means are capable of processing the acquired data, for deriving and displaying the temperature and or emissivity descriptive maps of the object by the display means.

The scanning means may comprise a plurality of sensors capable of simultaneously measuring electromagnetic radiation in a number of spectral bands.

In another embodiment, the scanning means may comprise a spatial optical filter divided into a number of sites for simultaneous acquiring the electromagnetic radiation from said plurality of respectively located segments of the object; each said site having N zones responsible for splitting the radiation acquired by the site into N spectral bands, thereby acquiring the electromagnetic radiation in all N spectral bands simultaneously. The splitting can be provided by chromatic beam splitters.

According to an alternative embodiment of the invention. the scanning means comprise a rotatable optical filter for acquiring electromagnetic radiation in said N spectral bands in sequence, and at least one infrared sensor.

If desired, said sensors are capable of remote scanning. Alternatively, the sensors may be designed for close range scanning.

By another embodiment of the invention the scanning means comprises at least five ground oriented sensors operating, respectively, in the $3-4\mu$, $4-5\mu$, $8-10\mu$, $10-12\mu$ and the near infrared and visible spectral bands and at least one space oriented sensor operating in the $0.4-2\mu$ spectral band.

In the preferred embodiment, the system is capable of object detecting in a selected region having a background including the ground and or the surrounding atmosphere, further comprising:

means for acquiring meteorological data indicative of climatic conditions of the selected region and the surroundings;

means for recording said meteorological data;

data storage means for storing the recorded meteorological data (possibly the same means as for storing the electromagnetic radiation data);

computational means for deriving from the stored metheorological data and the data on the electromagnetic radiation, descriptive maps of the selected region; and pattern recognition processor means for classifying the pixels of said maps.

By one embodiment of the invention said means for acquiring meteorolocical data are associated with meteorological stations.

In accordance with a preferred embodiment of the invention said computational means are capable of deriving from said descriptive maps a set of characteristic maps. In such an embodiment the said processor means preferably comprise optimizing means for selecting an optimal set of characteristic maps which is subjected to pixel classification. The pattern recognition processor means can comprise pixel classification means in which a number of classes is defined whereby the classified pixels are statistically associated with the classes. For example, the pattern recognition processor means can function based on a poly-Gauss expansion for determining the statistical distribution of the pixels, and means based on Bayes's method for sorting pixels into classes. The pattern recognition processor means may also comprise quality factor evaluation means.

According to one specific embodiment of the invention, the pattern recognition processor means includes additional geometrical classification means for determining the shape of the detected object.

In a specific embodiment of the invention, the remote sensing equipment and the data recording means are positioned on any movable platform (for example, are airborne), whereas the data storage means, computational means, classification means and pattern recognition means are on the ground. Alternatively, in some embodiments the remote sensing equipment, data recording means, data storage means, computational means, classification means and pattern recognition means may all be positioned on a movable platform (or, in a particular case, be airborne).

In the above embodiments, said computational means are adapted to stabilize and register the recorded and stored data of the acquired electromagnetic radiation with the platform's movement to obtain a real time mapping and pattern recognition.

It should be appreciated, that pattern recognition processor means can be capable of automatic recognition of objects positioned along or on the course of the moving platform, and if necessary, of initiating an alarm and automatic adjusting the course of the vehicle whenever an obstacle is recognized.

It goes without saying, that in the embodiments where the system enables the descriptive maps and the pattern recognition to be accomplished. the display means are capable of displaying the appropriate output data.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

Figure 1A:
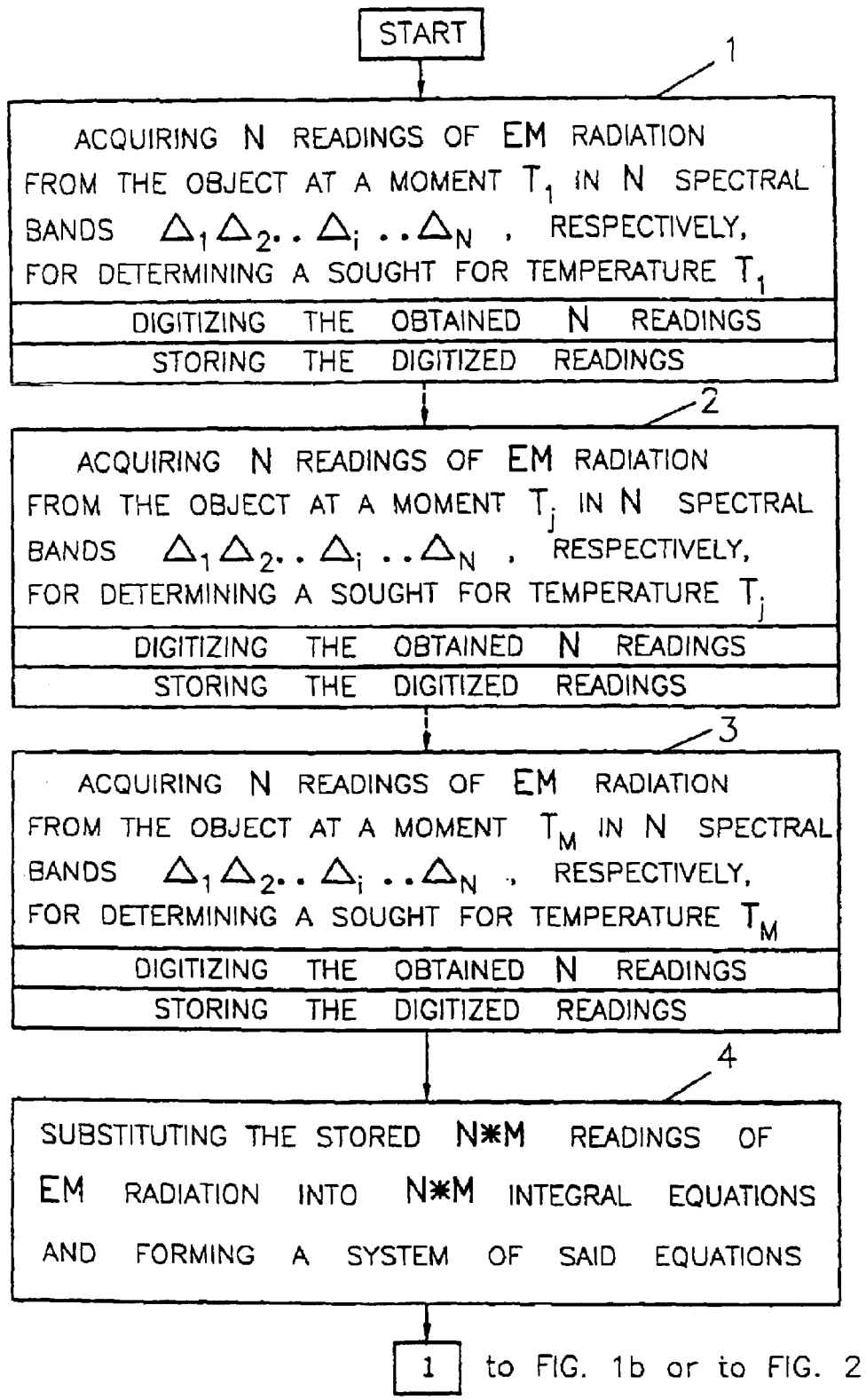
FIGS. 1a and 1b present a flowchart of the algorithm illustrating a method of non-contact temperature measurement according to the invention.

Before relating to the drawings, some basic terms and indications of constants and variables are to be introduced, which will be used further below in the examples of the inventive method.

In the case, when the method is applied to detecting and recognizing objects on or above the Earth's surface. a multi-spectral scanning means (e.g. radiometer) scans the area of the surface under investigation at at least one pixel at a time. The radiation received from each pixel by the radiometer, and by a pyranometer which receives radiation from the sky, serves as input for processing means which computes descriptive and characteristic maps of the selected region. The processing software is based on the Planck's equation:

$$W = \int \tau_A(\lambda)\tau_O(\lambda)\epsilon(\lambda,T)B(\epsilon,T)d\lambda + \int \tau_A(\mu)\tau_O(\mu)(1-\epsilon(\lambda,T))J(\lambda,T_S)d\lambda \quad (1)$$

where the integral is over the spectral region of the sensor under consideration and where:

W is the radiation received by the radiometer, $\tau_A(\lambda)$ is the spectral atmospheric transmissivity which can be obtained from standard sources (Wolfe and Zissis, Editors, 1993. The Infrared Handbook—revised edition. Environmental Research Institute of Michigan. U.S.A.: Selby et al, 1978. Atmospheric Transmittance/Radiance: Computer Code LOWTRAN 4, report no. AFGL-TR-78-0053. Optical Physics Division, Project 7670. Air Force Geophysics Laboratory, Hanscom AFB, MA. USA), $\tau_O(\lambda)$ is the spectral optical transmissivity of the radiometer including the transmissivity of the spectral filter, which can be measured by standard methods.

$\epsilon(\lambda,T)$ is the emissivity of a pixel in the selected region.

T is the temperature of a pixel in the selected region, $B(\lambda,T)$ is the spectral radiance of a black body at surface temperature T, (for the definition of $B(\lambda T)$ see—Bramson, 1968, Infrared Radiation—A Handbook for Applications. Plenum Press)

$T_s$ is the sky temperature, and $J(\lambda,T_s$ is the sky spectral radiance which is given by $B(\lambda,T_s)$, where a possible choice for $T_s$ is $T_s=T_a-100$ K, and where $T_a$ is the temperature of the atmosphere in the vicinity of the selected region.

The method will be further explained for a simplified particular example, e.g. for an object consisting of materials homogenous from the point of view of radiation parameters.

Radiation of the object includes three components:

$$W = W1 + W2 + W3$$

$$W1 = \epsilon * W_B$$

$$W2 = R * Y$$

$$W3 = tr * G$$

where:

W—total radiation of the object received by the radiometer

W1—radiation emitted by the object

W2—radiation reflected by the object

W3—radiation transmitted by the object through its body $\epsilon$—emissivity coefficient of the object R—reflectance coefficient tr—transmittance coefficient $(I = tr + R + \epsilon)$ $W_B$—radiation of the black body having temperature equal to that of the object G—radiation existing at the back side of the object Y—background radiation arriving to the object.

For a non-transparent object (having tr=0), which is heated to a relatively high temperature with respect to the ambient one. both W2 and W3 are equal 0.

In this case radiation $W^i$ in the spectral band $\Delta i = [\lambda_i, \lambda^i]$ can be represented by a formula (2) derived from the general (Planck's) equation (1):

$$H' = \int_{\lambda_i}^{\lambda'} \epsilon(\lambda, T) * B(\lambda, T) * d\lambda \quad (2)$$

i.e. taking into consideration that $\tau_d$ and $\tau_O$ are equal 1 and all members concerning atmosphere and sky are suppressed.

For determining intensity of infrared radiation emitted from the object a reference body can be selected, for which there are known its radiation/temperature dependencies in each predetermined spectral band.

A radiometer can detect radiation of the object in several spectral bands. In a specific spectral band. the received radiation $V^i$ may be represented by a Fredholm equation (3):

$$V' = \int_{\lambda_i}^{\lambda'} \varphi'(\lambda) * \epsilon(\lambda, T) * B(\lambda, T) * d\lambda \quad (3)$$

where $\phi^i(\lambda)$—function dependent on the radiometer's parameters for specific band "i" and on transmitting properties of the atmosphere.

If the radiation measurements are performed M times (1 . . . j . . . M), and each time in N spectral bands (1 . . . i . . . N), simultaneously (see blocks 1, 2, 3 in FIG. 1a). the following system of (N*M) equations may be built and solved:

$$H'' \equiv V'_T = \int_{\lambda_i}^{\lambda'} \varphi'(\lambda) * \epsilon(\lambda, T_j) * B(\lambda, T_i) * d\lambda \quad (4)$$

Figure 1B:
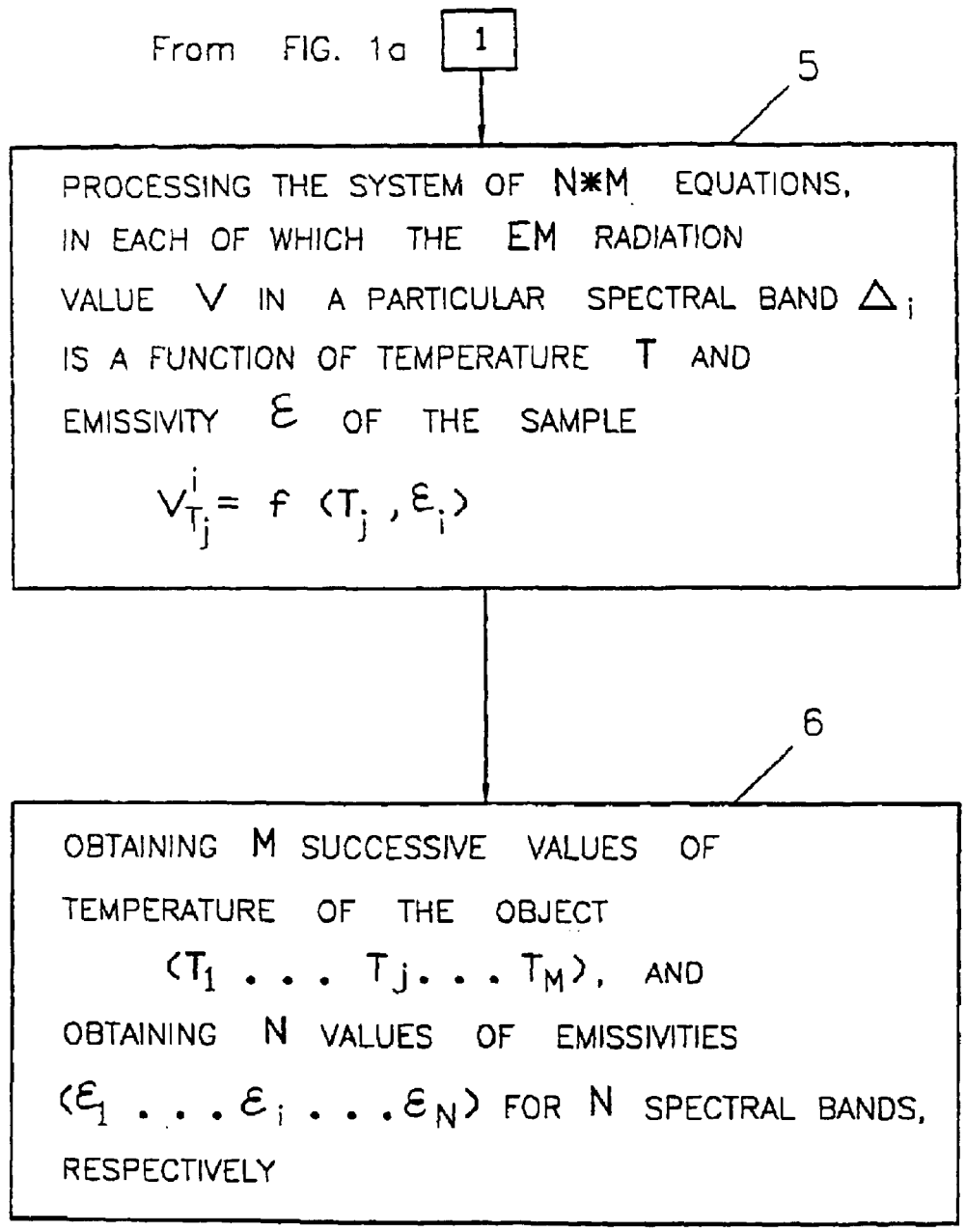

Solution of the above system of equations will comprise M value of temperature $(T_i \ldots T_j \ldots T_M)$ and, (in this simplified case), N values of emissivities $(\epsilon 1 \ldots \epsilon_i \ldots \epsilon_N)$ as can be seen from both the equations (4) and FIGS 1a, 1b (blocks 4, 5, and 6).

Figure 2:
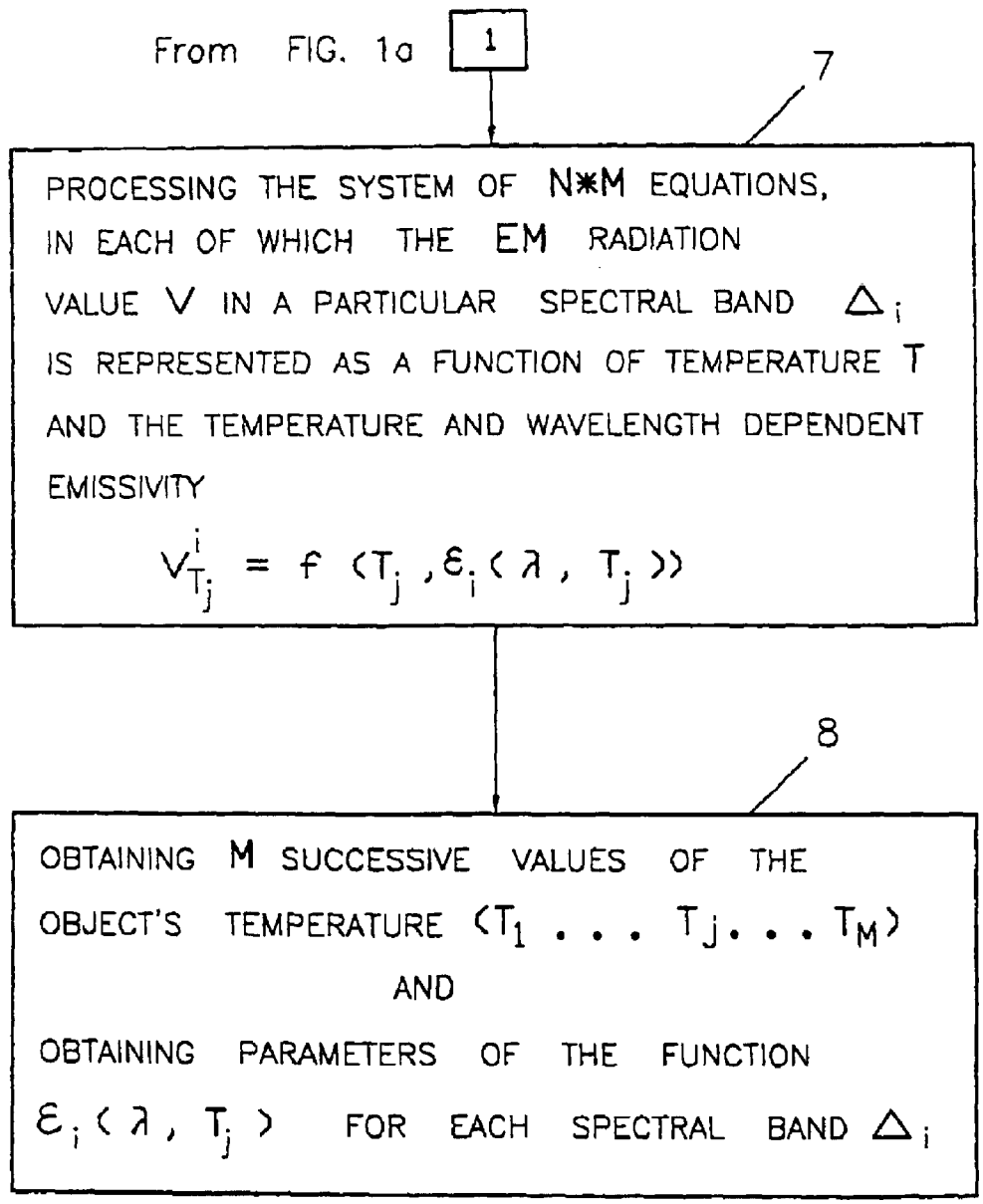
FIG. 2 is a flow-chart of a modified method based on that illustrated in FIG. 1b.

FIG. 2 illustrates another final portion of the flow-chart which, together with the flowchart diagram shown in FIG. 1a will form a general algorithm for cases when the object's emissivity depends both on wavelength and temperature. The system of equations processed in block 7 of the general algorithm is more complex than system (4) (see also block 5 in FIG. 1b), namely: in each of the N*M equations dependence of the emissivity variable "$\epsilon$" from temperature of the sample is taken into consideration.

For example, emissivity function of the heated object in spectral channel "i" can be represented as follows:

$$\epsilon(\lambda, T) = \sum_{k=1}^{K} E_l^i(\lambda) * S_k^i(T) \quad (5)$$

$(\lambda \in \Delta i)$ where:

$S_k^i(T)$—is a function reflecting dependency of the emissivity on temperature;

$E_k^i(\lambda)$—a function reflecting dependency of the emissivity on wavelength.

K—is the preselected number of terms $S_k^i(T) * E_k^i(\lambda)$

Behavior of the functions $S_k^i(T)$ and is assumed to be known (i.e. the functions are selected in advance); parameters of the function $E_k^i(\lambda)$ are also assumed to be known.

Based on the above, the following system of N*M equations may be _built and solved:

$$T'' = \sum_{k=1}^{K} S_k^i(T_j) * R_k^i(T_j) \quad (6)$$

where:

$$R_k^i(T_j) = \int_k^K E_k^i(\lambda) * \varphi^i(\lambda) * B(\lambda, T_j) * d\lambda \quad (7)$$

is integral of the preselected functions E, B and φ.

Solving the system (6) permits derivation of M values of the sample temperature, and N*K parameters for each of the functions $S_k^i(T_j)$.

In yet another example, the above mentioned emissivity function $S_k^i(T_j)$ may be expanded into a polynomial series, and the equation (5) will acquire the following form:

$$\varepsilon(\lambda, T) = \sum_{k=1}^{K} \sum_{q=1}^{Q} b_{kq}^i * P_q^i(T_j) * E_k^i(\lambda) \quad (8)$$

(λ∈Δi)
where:
  $b_{kq}^i$=parameters of function $S_k^i(T_j)$ in the "i" spectral band;
  $P_q^i(T_j)$=polynomial of a pre-selected form and with pre-selected coefficients;
  $(b_{kq}^i * P_q^i(T_j))$ forms $S_k^i(T_j)$;
  Q—number of polynomial coefficients.

The system of equations in this case will be as follows:

$$T'' = \sum_{k=1}^{K} \sum_{q}^{Q} b_{kq}^i * P_k^i(T_j) * R_{kq}^i(T_j) \quad (9)$$

where:
  i={1,N},j={1,M},k={1,K},q={1,Q}.

Solution of the above system of N*M equations will give M unknown values of temperature, and N*K*Q parameters $b_{kq}^i$ of the function $S_k^i(T_j)$ (for the case when in each spectral band there is one and the same number of the parameters).

It should be emphasized that, knowing the above mentioned parameters and the functions $E_k^i(\lambda)$, one can exactly define the wavelength and temperature dependent function of emissivity.

The above system of equations is linear for parameters $b_{kq}^i$, and non-linear for values of temperature $T_j$.

Accuracy of the temperature calculations depends on the following parameters:
  number N of the spectral bands, and on specific selection of the bands,
  number M of the "temperature" (i.e. electromagnetic radiation) measurements,
  quality of synchronizing of the "temperature" measurements in the N spectral bands, i.e. performing thereof (in the best case) substantially simultaneously,
  technical parameters of radiometers and accuracy of the radiometric measurements,
  accuracy of the mathematical model.

Based on the above description and examples, the method of remotely measuring temperature of an object suggested in the present application represents also a method of determining emissivity function of the object.

Figure 3:
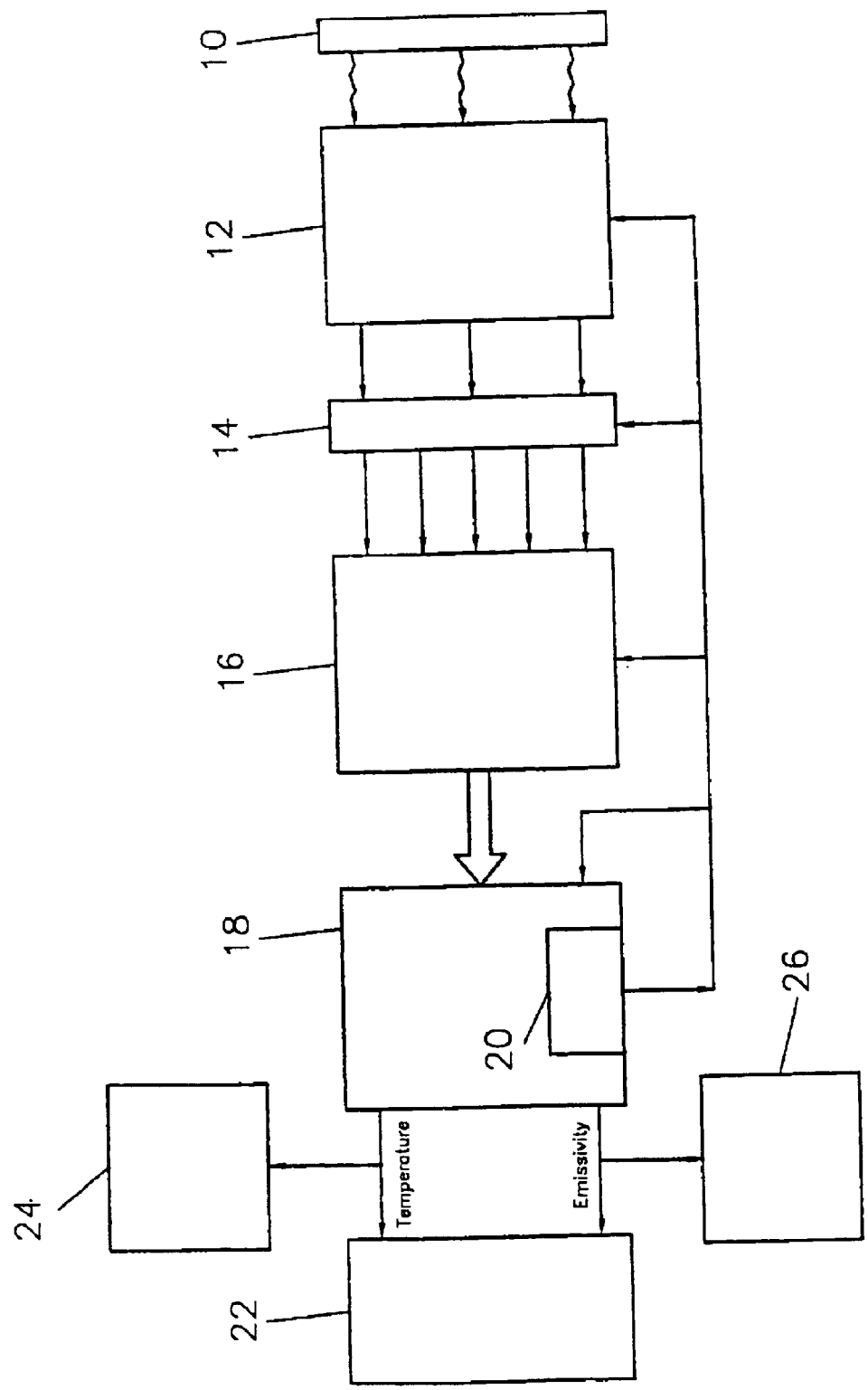
FIG. 3 is a block-diagram of a system implementing the inventive method.
Figure 4A:
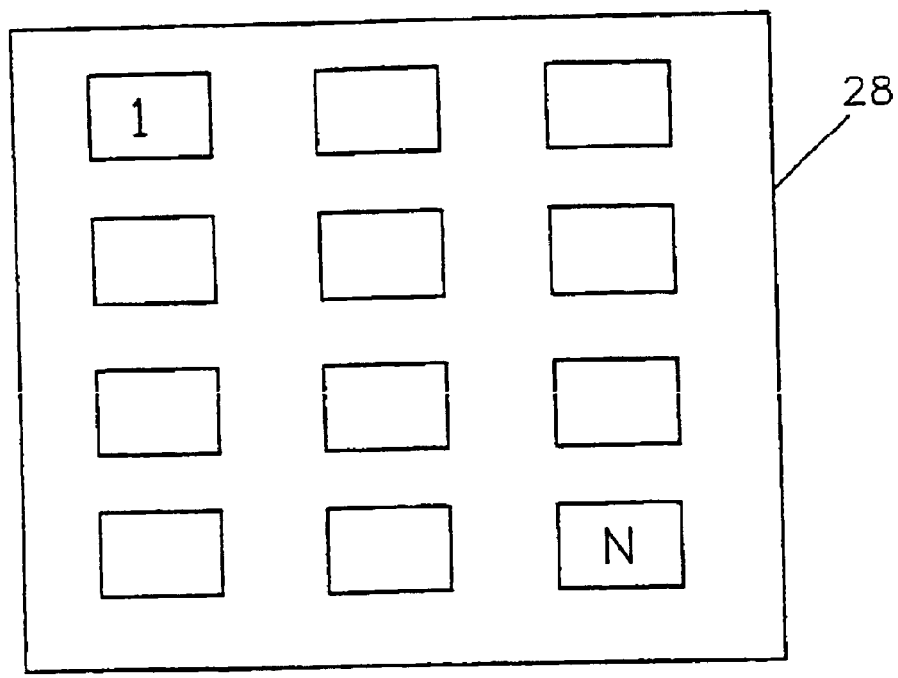
FIGS. 4a and 4b are schematic plan views of two embodiments of the filter shown in FIG. 3.

FIG. 3 illustrates a block-diagram of a system capable for implementing the inventive method. An object 10 (for example, a heated object) emits infrared radiation on to an optics 12 via which it is transmitted to a multichannel spatial filter 14. The multichannel spatial filter 14 performs simultaneous splitting of spectral lines into N spectral bands. In FIG. 4a there is shown a schematic plan view 28 of the multichannel spatial filter which is designed to split the spectrum into N=12 spectral bands (channels) by 12 zones capable to transmit radiation of different wavelengths. Practical implementation of the filter is not discussed in the frame of the present patent application. Intensities of the obtained N radiation portions are then detected by a detector 16 adapted for multichannel detection. "N" analogous readings of the electromagnetic radiation obtained by the detector 16 are converted into the digital form and transmitted to a processing unit 18 where they re stored for further processing.

Figure 4B:
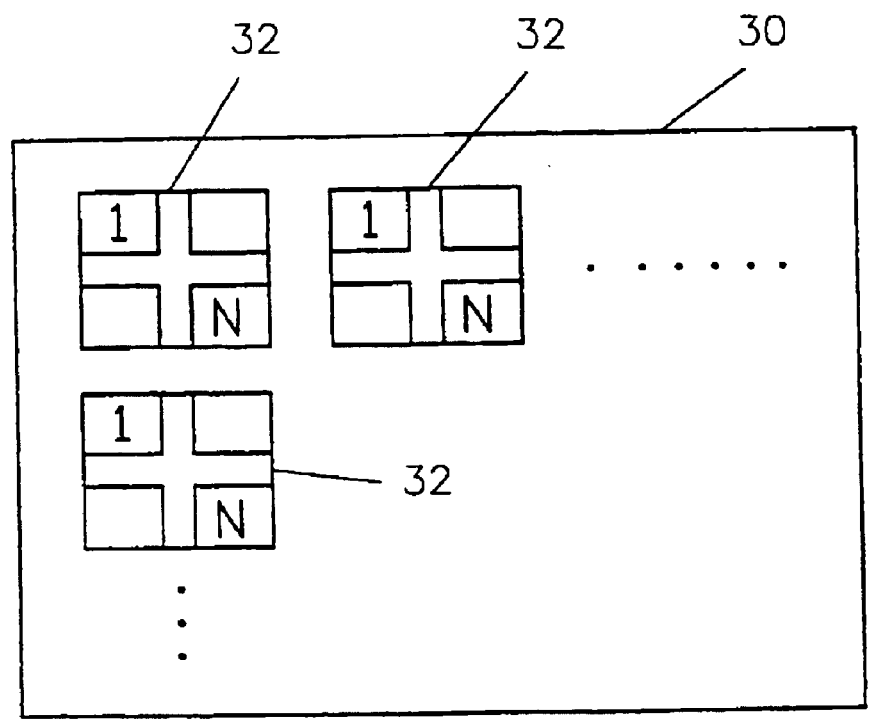

All the above-described operations are synchronized by a control unit 20 of the processing unit 18, which generates M successive synchronizing signals. Each of these M signals simultaneously activates optics 12, multichannel filter 14, detector 16 and processing unit 18 for performing and recording one of the M measurements of the infrared radiation being effected simultaneously in N spectral bands. M*N obtained digitized readings of the infrared radiation emitted from the object 10 are processed in the unit 18 as a system of equations having at least M+P unknowns comprising M values of temperature of the object and at least P parameters of its emissivity model. Values of the temperature (and/or of the emissivity), being solutions of these equations. are displayed by a display 27. If desired, the system can be adapted for deriving a temperature descriptive map of the object, as well an emissivity descriptive map thereof. To this end, optional thermal mapping unit 24 and an emissivity mapping unit are connected to the processing unit 18. FIG. 4b shows a filter structure suitable for making the mapping operation.

FIG. 4b illustrates a plan view of a spatial filter 30 divided into a number of sites 32 for acquiring infrared radiation from a number of respectively located segments of the object (not shown). Each site has N=4 zones responsible for splitting the infrared radiation acquired by the site into four spectral bands. Plurality of the split radiation portions from all sites of the tilter 30 may be then transmitted to a detector similar to that shown as 16 in FIG. 3, and further to a similar processing unit. The processing unit will process the stored digitized information so as to produce values of temperature and/or emissivity associated with every one of the sites 32 of the filter 30, for further composing a descriptive map of temperatures (emissivities) of the corresponding segments of the object.

Geometric shape and parameters of the spatial filter 30 may be selected according to each specific application.

Figure 5:
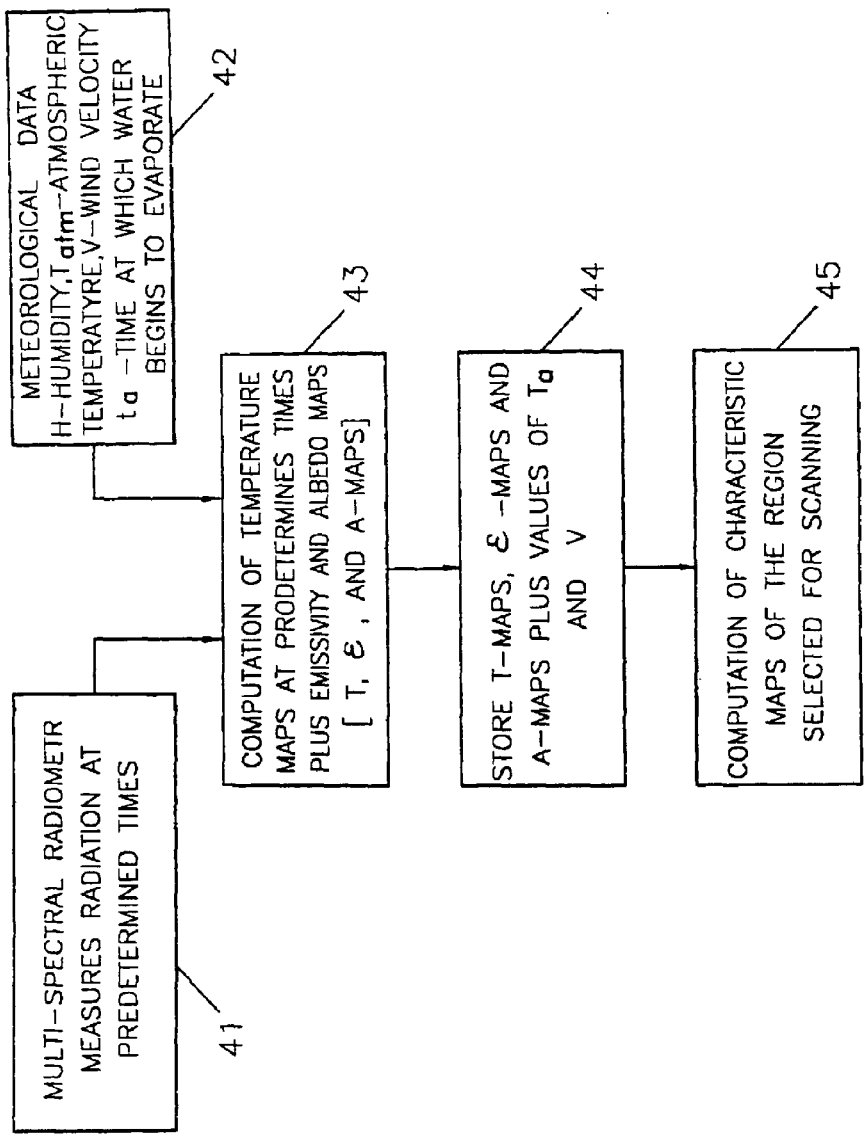
FIG. 5 is a block diagram of the process for determining the characteristic maps of the region selected for scanning.
Figure 6:
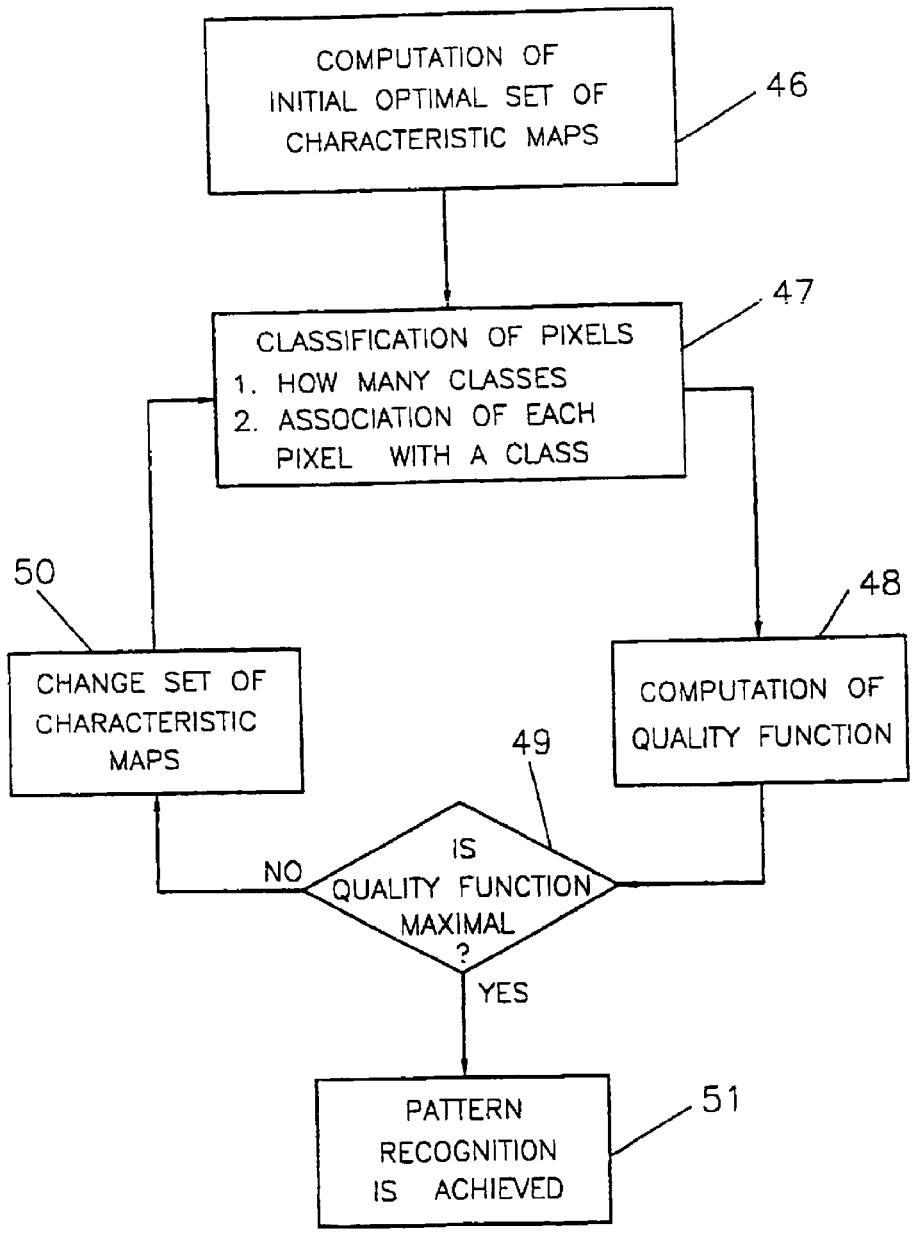
FIG. 6 is a block diagram of the pattern recognition process.

FIGS. 5 and 6 schematically illustrate a particular example of the inventive method for obtaining temperature emissivity maps of a selected region. with providing of further pattern recognition based on the obtained data. The particular example described below focuses on the detection of underground structures. It should be noted, however, that it applies mutatis is mutandis to the detection of on ground as well as to above ground targets.

Typically, the system used for passive remote sensing of the Earth's surface is a multi-spectral radiometer designed to operate in some convenient atmospheric window, e.g., between 8 and 12μ. The configurations and operation of such systems is well known to those skilled in the art (see. e.g., various articles appearing in: Proceedings of the First International Airborne Remote Sensing Conference and Exhibition, 12–15 Sep., 1994, Strasbourg, France) and, therefore, will not be expounded upon herein. Similarly, the operation of pyranometers, for measuring optical radiation from the sky, is well known to those skilled in the art (Kondratyev. 1969, Radiation in the Atmosphere, 62, Academic Press) and, will also not be expounded upon herein.

The detection of underground structures is performed by scanning the area of the Earth's surface under investigation a number of times, and extracting from the recorded data physical information characterizing heating and cooling processes that take place not only at the Earth's surface but also below the Earth's surface. To this purpose an equation of thermal balance is used that contains information regarding heat transfer processes above and below the Earth's surface, through a set of thermophysical constants. The information obtained is then processed by suitable statistical methods in order to detect regions having different thermal properties, in the region selected for scanning. These thermophysical inhomogeneous regions are classified in a pattern recognition process in which the underground structures are identified.

The detection process is divided into two main stases: a to pre-processing stage, in which temperature, emissivity and characteristic maps (maps of the thermophysical constants and statistical derivatives thereof) of the selected region are produced and a pattern recognition stage in which the underground structures are detected.

To effect the pre-processing stage a multi-spectral radiometer scans the area of the Earth's surface under investigation at at least one pixel at a time. Me radiation received from each pixel by the radiometer, and by the pyranometer which receives radiation from the sky, serves as input for pre-processing software which computes characteristic maps of the selected region based on the Plaznck's equation, the albedo equation and the energy balance equation.

A series of scans of the selected region are performed during a twenty-four hour period and the thermophysical constants are extracted from the energy balance equation (10):

$$(T(t)-T_n)P = \frac{1}{\sqrt{\pi}}\int_0^t \frac{l}{\sqrt{t-\eta}}[(1-A)]d\eta - \frac{\alpha}{\sqrt{\pi}}\int_0^t \frac{l}{\sqrt{t-\eta}}f(V(\eta)T_a(\eta)-T(\eta))d\eta - \frac{\beta}{\sqrt{\pi}}\int_0^t \frac{l}{\sqrt{t-\eta}}g(\eta)d\eta + \frac{Q}{\sqrt{\pi}}\int_0^t \frac{l}{\sqrt{t-\eta}}d\eta \quad (10)$$

where. $T(\eta)$ is the temperature of a pixel in the selected region at time $\eta$, $T_0$ is the temperature of the pixel at the time, $t_0$, of the first scan of the series, $T_0(\eta)$ is the temperature of the atmosphere in the vicinity of the selected region at time $\eta$, $l(\eta)$ is the radiance of the sun and the sky in the visible and near infra red region, $J(\eta)$ is the radiance of the sky and the sun in the region
8–12$\mu$ at time $\eta$,
$\sigma$ is Stefan Boltzman's constant,
P is the thermal inertia.
$\alpha$ is the coefficient of heat transfer,
$\beta$ is the coefficient of mass transfer, and
Q is the thermal flux for conduction.

The energy balance equation (10) contains into functions. $f$ and $g$ that will be described below, and four unknown thermophysical constants, $\alpha$ $\beta$ P and Q that are to be computed at each pixel. Since, in the example chosen. of an underground structure, there are four unknowns. four equations are required to solve for them. The four equations are obtained by scanning the selected region five times during a twenty-four hour period. The first scan, performed at time $t=0$ gives rise to zero on the left hand side of equation (10) and is not used. The remaining four scans give rise to a set of four linear equations which can solved for the unknown thermophysical constants. Since the computations are performed for each pixel of the selected region the result is a set of maps, an $\alpha$ map, a $\beta$ map, a P map and a Q map.

As is well known to those skilled in the art, there are a number of possibilities for the choice of the function $f$ for a discussion of various possible choices see: Jakob. 1965, Heat Transfer. John Wiley & Sons. For example. for low wind speeds an expression for this function is given on page 473. Eqn. (22–91), whereas for high wind speeds an appropriate expression is given on page 555 by Eqn. (26–29)). In the present example, the following choice for the function $f$ is made:

$$f=(0.064+0.032\ V(\eta)^{0.8}(T_a(\eta)-T(\eta))$$

where. $V(\eta)$ is the wind speed over the selected region at time $t=\eta$ and the other variables are as defined above. This expression for the function $f$ is valid for wind speeds less than 40 kilometers per hour.

There are also a number of possibilities for the choice of the function g (see Rosema, 1975, "Simulation of the Thermal Behavior of Bare Soils for Remote Sensing Purposes" in: Report 11. Netherlands Interdepartmental Working Community for the Application of Remote Sensing Technology, Delft, The Netherlands), in the present example the following choice is made:

$$g(\eta)=(\eta-t_a)^{\gamma_1}e^{\gamma_2(\eta-t_a)}$$

where, $t_a$ is the time at which water starts to evaporate from the ground, at the selected region. due to heating by the sun. This time is normally defined as the time at which the sun makes an angle of 20° to the horizon during sunrise. $\gamma_1$ and $\gamma_2$ are constants that are determined empirically by performing controlled measurements for given families of ground types. Once determined, the values of $\gamma_1$ and $\gamma_2$ can be stored and used as required. In general the values of $\gamma_1$ and $\gamma_2$ depend on the humidity of the ground. It has been found that they have one substantially constant value, for relative humidities less than 12%, and another substantially constant value for relative humidities greater or equal than 12% and less than 30%. For example, for sand-based earth $\gamma_1=4.76$ and $\gamma_2=0.72$ for relative humidities of the ground less than 12%, and $\gamma_1=4.61$ and $\gamma_2=0.748$ for relative humidities of the ground greater or equal than 12%. Detection of underground structures for relative humidities of the ground above 30% and for rainy conditions is not possible. Information on rain, clouds, the atmospheric temperature and wind speed is obtained from meteorological stations.

The computation of the thermophysical constants is summarized in FIG. 5. The radiation measured by the multi-spectral radiometer (block 41) along with relative humidity and atmospheric temperature readings (block 42) is conveyed to the computational process (block 43) which uses the above-described equation (4) and an albedo equation to compute the temperature (T), emissivity ($\epsilon$) and albedo (A) maps, which are stored in the storage means (block 44). After the fifth scan in the twenty four hour period has been made, the T,$\epsilon$ and A maps from the last four scans along with the time $t_n$ and the wind speed V are conveyed to the computational process (block 45), which uses the energy balance equation, to compute the maps of the thermophysical constants α, β, P and Q.

The pattern recognition stage is initiated by a process in which an optimal set of characteristic maps is determined. In addition to the α, β, P and Q maps, maps of the average, and of the variance, of α, β, P and Q are computed. The average and the variance are computed by standard statistical techniques (see, e.g., Tou and Gonzalez, 1974, Pattern Recognition Principles. Addison-Wesley Publishing Co. Inc.). In addition, texture maps for each of α, β, P and Q are computed. Texture maps can be computed in a number of ways (for a description of the concepts of image texture see, e.g., Haralick, 1982, "Image Texture Survey", in Handbook of Statistics, Krishniah and Kanal. editors, Vol. 2, 399), e.g., with aid of the computation of the two dimensional autocorrelation function according to the following equation:

$$K_\phi(\rho) = e^{-\lambda_\phi \rho} \cos(\omega_\phi \rho),$$

where, ρ is a translational distance between pixels and φ is a translational angle between the pixels, defined as the angle between the horizontal axis and the line joining the origin of the coordinate system to the pixel under consideration. $\lambda_\phi$ and $\omega_\phi$ are constants of the autocorrelation function. As φ varies from 0° to 360° $\mu_\phi$ and $\omega_\phi$ take on a set of possible values. the parameters that describe the set of possible values of $\lambda_\phi$ and $\omega_\phi$ are the parameters that characterize the texture. Since the texture assists in the classification process it is important to have a fairly simple representation for the set of values it comprises. To this end, the envelope of the set of maximal values of $\lambda_\phi$ and $\omega_\phi$ is chosen to be an ellipse. In order then to characterize the texture. the parameters of the ellipse of the maximal values of $\lambda_\phi$ and $\omega_\phi$ have to be computed. An ellipse is described by three parameters, its minor axis. its major axis and the orientation of the ellipse in the plane of its definition. All in all, to characterize the texture, seven parameters are required. three that characterize the ellipse of the maximal values of $\lambda_\phi$. three to that characterize the ellipse of the maximal values of $\omega_\phi$ and one for the angle between the axes of the two ellipses. Hence, seven texture maps are computed for each of the thermophysical constants α, β, P and Q. Hence, initially twenty eight texture maps are required. The maps of α, β, P and Q, and of their average and variance, and the texture maps of α, β, P and Q define a set of characteristic maps of the selected region.

Areas of the selected region containing underground structures have surface temperatures that are very slightly different from those of the surroundings. These very slight temperature differences give rise to temperature maps of very low contrast in which it is difficult to distinguish between normal ground areas and those covering underground structures. The characteristic maps of the selected region serve to augment the temperature maps and to increase the contrast between these two types of grounds. Since there are a large number of maps and a large number of pixels per map, statistical methods are used for associating, or classifying, the pixels of the selected region with various backgrounds and targets therein.

In the classification process the selected region is divided into classes. Initially the number of classes is as the number of pixels, however. in order for the pattern recognition process to be successful, the number of classes should be representative of the number of types of different backgrounds and targets, i.e., enquiry sectors. in the selected region. The classification process is carried out in two stages; the learning stage and the association stage. In the learning stage the number of classes in the selected region is determined, whereas in the association stage each of the pixels in the maps is associated with a class. To perform the classification a suitable statistical function describing the distribution of pixel values is chosen. For example. but by no means binding, a sum of weighted Gaussians, i.e. a poly-Gauss. can be chosen:

$$P(\bar{s}) = \sum_{i+j} \omega_i N_i(\delta_i, \bar{s})$$

where:
$N_i(\delta_i, \bar{S})$ is the $i^{th}$ Gaussian in the sum,
$\omega_i$ is the weight of the $i^{th}$ Gaussian in the sum,
$\bar{S}$ is a vector whose components are the elements of the set of characteristic maps of the selected region,
m in is the number of classes, and
$\delta_i$ represents the parameters of the $i^{th}$ Gaussian in the sum (for the properties of Gaussian distributions see—Tou and Gonzalez, ibid.).

The learning stage consists of determining the values of m. $\omega_i$, and $\delta_i$. or. if a different distribution is chosen, the equivalent parameters. $\omega_i$, and $\delta_i$ are chosen such that the poly-Gauss distribution density is maximal for a given vector $\bar{s}$. The value of m is determined by including in the weighted sum only those terms for which:

$$\omega_i/\Delta\omega_i < v.$$

where, v is chosen optimally by trial and error to include enough terms in the sum so that the pattern recognition process is successful, whilst on the other hand it should be as small as possible so as to keep the computational complexity to a minimum. The error in computing $w\omega_i$, $\Delta\omega_i$, is determined using Fisher's matrix (Rao, 1973. Linear Statistical Inference and its Application. Wiley). The value v=2 has been found to be optimal in a number of pattern recognition experiments that where conducted.

The association stage is performed by computing for each pixel, say the $i^{thx}$. the probability, $P_{ik}$, that it belongs to class, k, for each class in the selected region. using, e.g., Bayes' equation (see, Rolston, Principles of Artificial Intelligence and Expert Systems Development, McGraw-Hill. 99). The decision for associating the $i^{th}$ pixel with the $k^{th}$ class is made by determining the maximal value of $$\bar{P}_{ik} = P_{ik} - \gamma \Delta P_{ik},$$

for a fixed value of i as k runs over all the classes. The error, $\Delta P_{ik}$, in computing the probability, $P_{ik}$, can be determined using Fishers matrix (Rao, 1973.). The constant γ, is determined empirically in controlled experiments by finding the minimum set of characteristic maps that enable target detection to a required degree of accuracy. For γ=0 the fall set of characteristic maps has to be included in the pattern recognition process giving rise to maximum complexity in the computational process. In a certain set of controlled experiments it was found that $1 \leq \gamma \leq 3$. Invariably, the choice γ=2 has been found to give good results for a minimal computational load.

In the manner described, the class to which each pixel belongs is determined, hence effecting the association stage and thereby completing the classification process.

Having determined the value of γ, a quality factor, Q(s), is defined in order to effect the pattern recognition process:

$$Q(s) \approx \bar{P} - \gamma \Delta \bar{P}$$

where. $\bar{P}$ is the average probability of associating each element of a set to its class. and can be computed using Bayes theorem. $\Delta \bar{P}$, is the error in computing the probability $\bar{P}$. and can be computed using Fisher's matrix. The constant γ, is the same as that discussed in the foregoing. The pattern recognition process entails determining that set of characteristic maps that makes Q(s) maximal. In other words the value of Q(s) is a criterion for the quality of the classification of the selected region. The process then is carried out as follows; choose a set of characteristic maps, perform the classification process and compute Q(s). If Q(s) is not close to the value 1. then choose another set of characteristic maps, perform the classification process again and re-compute Q(s). If the value of Q(s) is close to 1, then an optimal set of characteristic maps has been found and the classification process is declared successful. If the value of Q(s) is not close to 1, then the process is repeated until the classification process can be declared successful. An underground structure is then an anomaly in the selected region, i.e. any area in the selected region that does not belong to a defined class. is then declared to be an underground structure. Normally, the pattern recognition process starts off with a very large set of characteristic maps and the computational load is very heavy. In order to partially reduce the computational load, the pattern recognition process is performed with a priorly optimized set of characteristic maps. This optimization is achieved by performing a least squares calculation (see—Lawson and Hanson, Solving Least Squares Problems. Prentice-Hall) on Q(s) using a weighted set of characteristic maps in order to find the relative weights of the characteristic maps in their contribution to Q(s). Those characteristic maps having a small weight are discarded.

Sometimes there may be prior information as to the form of the underground structures. In such an event the classification process can be enhanced and the anomalies in the selected region can be sorted by geometrical form, making the identification of an underground structure much more reliable.

The pattern recognition process is summarized in FIG. 6. The complete set of characteristic maps is initially optimized at stage 46 using least squares. The initially optimized set of characteristic maps is then used to classify the pixels into classes (block 47), by performing the learning and association stages as described above. The quality factor is then computed, at stage 48. and its value is checked, stage 49. If the value of the quality factor is not maximal, then a new set of characteristic maps is chosen from the initially optimized set of characteristic maps (process 50). Processes 47, 48, 49 and 50 are continually performed until an optimal value for the quality factor is obtained, at the stage pattern recognition is achieved (block 51). The pattern recognition process can also include an additional geometrical classification process for determining the shape of the detected object. This is particularly useful when detecting underground objects of a known shape. In general. the anomalous region defining the underground object may be larger than the object to be detected, in which case distribution of the anomalous pixels can be studied for the known geometrical trends (for standard methods see Tou and Gonzalez, ibid).

Figure 7:
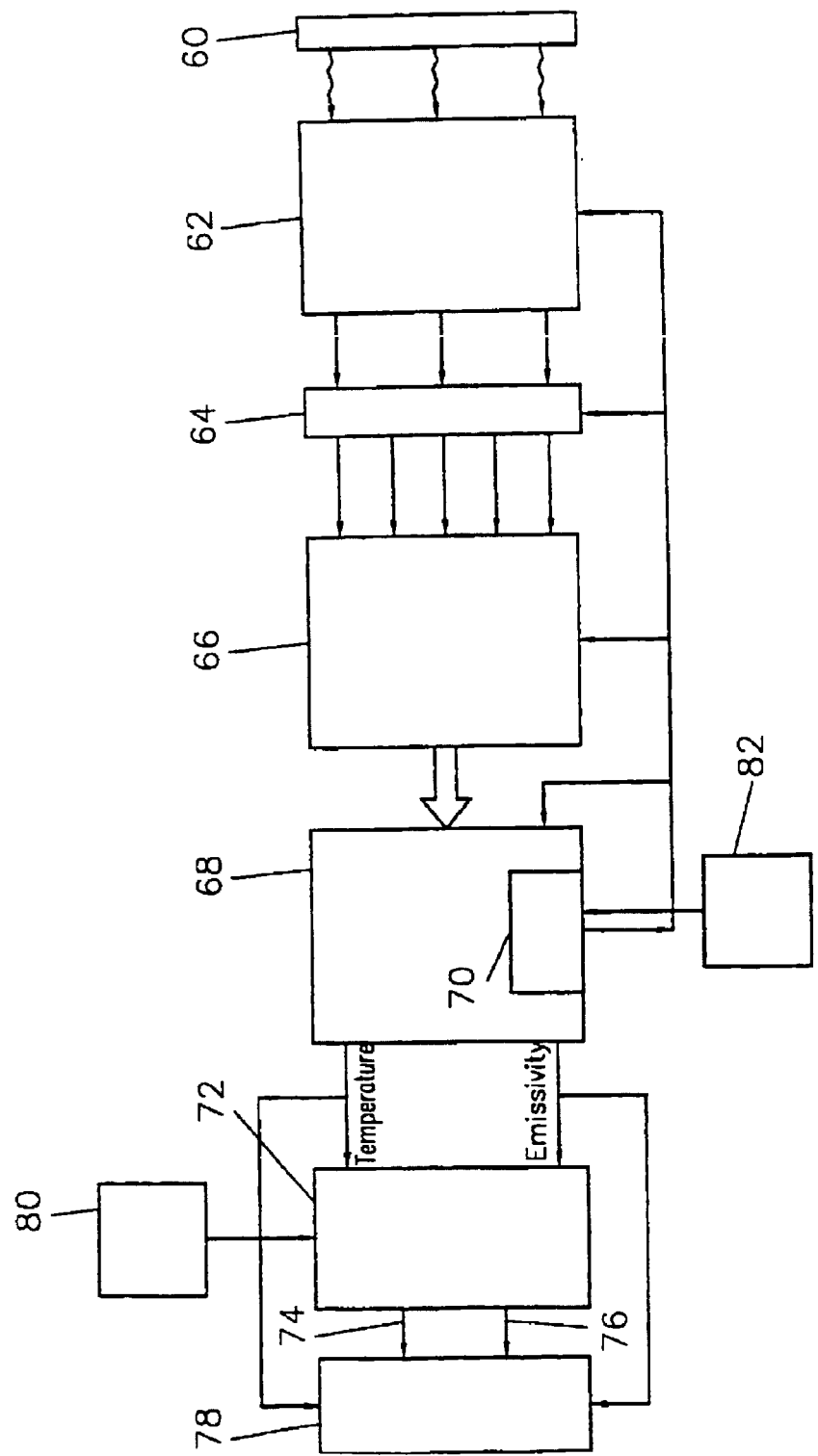
FIG. 7 is a block diagram of a system according to the invention for performing non-contact temperature/emissivity measurements and pattern recognition.

FIG. 7 schematically illustrates a system for obtaining temperature/emissivity maps of a selected object and further recognition of segments thereof based on the obtained maps and some additional parameters (such as thermophysical constants and metheorological data). An object 60 (for example. a selected region on or above the earth) emits electromagnetic radiation on to an optics 62 via which it is transmitted to a multi-channel sequential filter 64 (for example, a rotational filter). The filter 64 produces N radiation portions in N respective spectral bands in sequence. Intensities of the obtained N radiation portions are then detected by a detector 66. "N" analogous readings of the electromagnetic radiation obtained by the detector 66 are further converted into the digital form and transmitted to a processing unit 68 where they are stored for further processing. M*N obtained digitized readings of the radiation emitted from the object 60 are processed in the unit 68 as a system of equations built according to formula (1). Values of the temperature (and/or the emissivity parameters or values), being solutions of these equations, are further transmitted to a pattern recognition processor 72 for building respective temperature and emissivity descriptive maps. per pixel. i.e. per segment of the object. However, data on the temperature and emissivity (if applicable) can be directly transmitted to display means 78. for optional indication. The pattern recognition processor 72 also receives meteorological and thermophysical data schematically shown as block 80, and processes the temperature and emissivity data received from the processing unit 68 to produce a file 74 being a contrast descriptive map of the object and a file 76 being a classified image thereof. The contrast descriptive map 74 is a characteristic map based on a combination of the temperature and emissivity descriptive maps, and the classified image 76 is a result of the pattern recognition processing based on the map 74 and the data 80. The display means 78 serves for graphical representation of the obtained files 74 and 76. The system illustrated in the drawing is adapted to obtain information on the electromagnetic radiation from the object 60 with is the aid of a movable platform (such as a helicopter), and to process it. To this end. the control unit 70 of the processing unit 68 may receive data (schematically shown as block 82) on the velocity of the platform's movement with respect to the object. The unit 68 is provided with software means capable of registering the descriptive maps of temperature and emissivity with the platform movement. All the above-described operations are synchronized by a control unit 70 of the processing unit 68, which generates M successive synchronizing signals per each segment of the object 60. Each of these M signals simultaneously activates optics 62. filter 64. detector 66 and processing unit 68 for performing and recording each of the M measurements of the radiation in N spectral bands in sequence.

What is claimed is:

1. A method for detection and recognition of an object that includes a plurality of sub-objects, the sub-object having a plurality of unique physical parameters; said object located in a selected region, and said sub-objects having a background, the method comprising the steps of:

(a) acquiring electromagnetic radiation data of electromagnetic radiation emitted from the selected region in at least two spectral bands by measuring it in at least one time, each time in said spectral bands, thus obtaining at least two readings;

(b) recording the acquired electromagnetic radiation data by means of a suitable radiation data recording means;

(c) storing the recorded electromagnetic radiation data in a suitable electromagnetic radiation data storage means;

(d) deriving descriptive maps constituted by pixels of the selected region from the electromagnetic radiation data stored in said suitable electromagnetic radiation data storage means; and (e) classifying the pixels of said descriptive maps of said selected region by pattern recognition processor means, the classifying by sorting the pixels into classes comprising the steps of describing statistical distribution of the pixels by using a poly-Gauss expansion; and calculating probabilities of association of the pixels with the classes by using Bayes' formula, whereby the desired object detection and recognition are achieved.

2. A method for detection and recognition of an object that includes a plurality of sub-objects, the sub-object having a plurality of unique physical parameters; said object located in a selected region, and said sub-objects having a background, the method comprising the steps of:

(a) acquiring electromagnetic radiation data of electromagnetic radiation emitted from the selected region in at least two spectral bands by measuring it in at least one time, each time in said spectral bands, thus obtaining at least two readings;

(b) recording the acquired electromagnetic radiation data by means of a suitable radiation data recording means;

(c) storing the recorded electromagnetic radiation data in a suitable data storage means;

(d) acquiring meteorological data indicative of climatic conditions of the selected region on the ground and the surrounding atmosphere;

(e) recording the meteorological data by means of a suitable meteorological data recording means;

(f) storing the meteorological data in suitable meteorological data storage means, (g) deriving descriptive maps constituted by pixels of the selected region from the electromagnetic radiation data stored in said suitable electromagnetic data storage means and the meteorological data stored in said suitable meteorological data storage means; and (h) classifying the pixels of said descriptive maps of said selected region by pattern recognition processor means, the classifying by sorting the pixels into classes comprising the steps of describing statistical distribution of the pixels by using a poly-Gauss expansion; and calculating probabilities of association of the pixels with the classes by using Bayes' formula, whereby the desired object detection and recognition are achieved.

3. The method according to claim 1 wherein said electromagnetic radiation data are provided in infrared spectrum area.

4. The method according to claim 1, wherein the step of deriving descriptive maps of the selected region is performed by solving a system of a number of equations for deriving temperature and/or emissivity descriptive maps, the number of equations equals to the number of said readings, each equation describing the electromagnetic radiation that is emitted from the region in one of said bands as a function of the temperature and the emissivity of the region, wherein the emissivity is a function of at least two arguments being temperature and wavelength.

5. The method according to claim 2 wherein said meteorological data are humidity, atmospheric temperature and wind velocity, the data obtained from meteorological stations.

6. The method according to claim 4 wherein said descriptive maps are temperature, emissivity and albedo descriptive maps determined with respect to a plurality of representative segments of the region, and mapping of the determined values to a representative pixel of the descriptive maps, wherefrom at least one set of characteristic maps of the selected region is derived by incorporating suitable reference data.

7. The method according to claim 6 further comprising the step of deriving an optimal set of characteristic maps of the selected region.

8. The method according to claim 7 wherein a step of classifying pixels of said descriptive maps further comprising the steps of defining a quality function and determining a set of characteristic maps that makes the quality function maximal.

9. The method according to claim 1, further comprising the step of determining the shape of the detected object by geometrical classification means included additionally in the pattern recognition processor means.

10. The method according to claim 1, adapted for real time mapping of different physical characteristics of a plurality of selected regions to be observed.

11. The method according to claim 1, adapted for real time mapping and classifying different physical characteristics of a plurality of selected regions to be observed, wherein the step of acquiring said electromagnetic radiation data is provided in real time by equipment mounted on a moving platform while displacing along said plurality of representative segments of the regions; and wherein the steps of recording, storing the acquired electromagnetic radiation data, and deriving descriptive maps of the selected region from the acquired electromagnetic radiation data are all registered with displacement of the platform.

12. The method according to claim 10, wherein said different physical characteristics are selected from the group consisting of temperature, emissivity and albedo.

13. The method according to claim 11 further comprising the step of automatic detecting and recognizing objects from the moving platform.

14. The method according to claims 1, applied for detection of underground structures detection, comprising the steps of:

(a) extracting physical information from the recorded data, said physical information characterizing heating and cooling processes that take place at the ground surface and below it by applying an equation of energy balance and a set of thermophysical constants;

(b) processing the information for detecting thermophysical inhomogeneous regions, the regions having different thermal properties in the region selected for scanning; and (c) classifying the inhomogeneous regions by said pattern recognition processor means, thereby identifying the underground structures.

15. The method according to claim 14 wherein derivation of the descriptive and characteristic maps is based on Planck's equation describing the electromagnetic radiation that is emitted from and reflected by the ground.

16. The method according to claim 15 wherein characteristic maps are selected from the group essentially consisting of maps of thermal inertia, thermal flux, coefficient of heat transfer and coefficient of mass transfer.

17. A system for detection and recognition of an object that include a plurality of sub-objects, said object located in a selected region, and said sub-objects having a background, the system comprising:

(a) means for acquiring and recording electromagnetic radiation data of electromagnetic radiation emitted from the selected region having at least one sensor;

(b) means for acquiring and recording meteorological data indicative of climatic conditions of the selected region on the ground and the surrounding atmosphere;

(c) storage means coupled with the acquiring and recording means for storing the electromagnetic radiation and meteorological data, (d) a processor coupled with said storage means for deriving descriptive maps of the selected region from the stored meteorological and electromagnetic radiation data, descriptive maps constituted by pixels of the selected region from the stored electromagnetic radiation data; and (e) a pattern recognition processor means being in communication with said processor for classifying pixels of said descriptive maps of said selected region by sorting the pixels into classes, the classifying by using a poly-Gauss expansion in order to describe the statistical distribution of the pixels and the Bayes' formula in order to calculate the probabilities of association of the pixels with the classes.

18. The system according to claim 17 wherein means for acquiring meteorological data provides humidity, atmospheric temperature and wind velocity, the data obtained from meteorological stations.

19. The system according to claim 17 wherein said sensor for acquiring electromagnetic radiation data of electromagnetic radiation emitted from the selected region operate in infrared spectrum area.

20. The system according to claim 17 wherein said processor is capable of deriving from said descriptive maps a set of characteristic maps.

21. The system according to claim 17 wherein said pattern recognition processor means is integrated with an optimizing means for selecting an optimal set of characteristic maps, which is subjected to classification of pixels.

22. The system according to claim 17 wherein said pattern recognition processor means is integrated with an classification means in which a number of classes is defined, whereby the classified pixels are statistically associated with the classes.

23. The system according to claim 21 wherein said pattern recognition processor means are further integrated with a quality factor evaluation means.

24. The system according to claim 17 wherein said pattern recognition processor means further include additional geometrical classification means for determining the shape of the detected object.

25. The system according to claim 17 wherein the means for acquiring and recording electromagnetic radiation data are positioned on a movable platform, whereas the means for storage the data, said processor, and the pattern recognition processor means are placed on the ground.

26. The system according to claim 17 wherein the means for acquiring meteorological data and the means for acquiring and recording electromagnetic radiation data are positioned on a movable platform, whereas the means for storage the data, said processor, and the pattern recognition processor means are placed on the ground.

27. The system according to claim 17 wherein the means for acquiring and recording electromagnetic radiation data, the means for storage the data, said processor, and the pattern recognition processor means are portable and mountable on movable platform.

28. The system according to claim 17 wherein the means for acquiring meteorological data, the means for acquiring and recording electromagnetic radiation data, the means for storage the data, said processor, and the pattern recognition processor means are portable and mountable on movable platform.

29. The system according to claim 17 wherein said pattern recognition processor means are capable of automatic detection and recognition of the objects.

30. The system according to claim 17 wherein the means for acquiring electromagnetic radiation data are further integrated with a rotatable optical filter for acquiring the electromagnetic radiation in at least two spectral bands in sequence.

31. A system for detection and recognition of an object that include a plurality of sub-objects, said object located in a selected region, and said sub-objects having a background, the system comprising:

(a) a means for acquiring and recording electromagnetic radiation data of electromagnetic radiation emitted from the selected region having at least one sensor;

(b) a storage means coupled with the acquiring and recording means for storing the electromagnetic radiation data;

(c) a processor coupled with said storage means for deriving descriptive maps of the selected region from the stored electromagnetic radiation data descriptive maps constituted by pixels of the selected region from the stored electromagnetic radiation data; and (d) a pattern recognition processor means being in communication with said processor for classifying pixels of said descriptive maps of said selected region by sorting the pixels into classes, the classifying by using a poly-Gauss expansion in order to describe the statistical distribution of the pixels and the Bayes' formula in order to calculate the probabilities of association of the pixels with the classes.

wherein said pattern recognition processor means are capable of extracting physical information from the recorded data, said physical information characterizing heating and cooling processes that take place on a ground surface and below it by applying an equation of energy balance and a set of thermophysical constants, processing the information for detecting thermophysical inhomogeneous regions, the regions having different thermal properties in the region selected for scanning, and classifying the inhomogeneous regions by said pattern recognition processor means, thereby providing identification and display of the underground structures.

32. A system for detection and recognition of an object that include a plurality of sub-objects, said object located in a selected region, and said sub-objects having a background, the system comprising:

(a) a means for acquiring and recording electromagnetic radiation data of electromagnetic radiation emitted from the selected region having at least one sensor;

(b) a storage means coupled with the acquiring and recording means for storing the electromagnetic radiation data;

(c) a processor coupled with said storage means for deriving descriptive maps of the selected region from the stored electromagnetic radiation data, descriptive maps constituted by pixels of the selected region from the stored electromagnetic radiation data and (d) a pattern recognition processor means being in communication with said processor for classifying pixels of said descriptive maps of said selected region by sorting the pixels into classes, the classifying by using a poly-Gauss expansion in order to describe the statistical distribution of the pixels and the Bayes' formula in order to calculate the probabilities of association of the pixels with the classes, wherein the means for acquiring electromagnetic radiation data are further integrated with a spatial optical filter divided into a number of sites for simultaneous acquiring of the electromagnetic radiation from a plurality of segments of the object, each the site having N zones responsible for splitting the radiation acquired by the site into N spectral bands, wherein N is at least two, thereby acquiring the electromagnetic radiation in all N spectral bands simultaneously.

* * * * *